United States Patent
Nagasaka et al.

(10) Patent No.: US 7,706,582 B2
(45) Date of Patent: Apr. 27, 2010

(54) PERSONAL AUTHENTICATION DEVICE

(75) Inventors: Akio Nagasaka, Kokubunji (JP); Takafumi Miyatake, Hachioji (JP); Naoto Miura, Kokubunji (JP); Yuichi Kashimura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/907,736

(22) Filed: Oct. 17, 2007

(65) Prior Publication Data

US 2008/0049982 A1 Feb. 28, 2008

Related U.S. Application Data

(63) Continuation of application No. 11/812,546, filed on Jun. 20, 2007, which is a continuation of application No. 10/617,828, filed on Jul. 14, 2003, now Pat. No. 7,245,745.

(30) Foreign Application Priority Data

Mar. 4, 2003 (JP) .............................. 2003-056516

(51) Int. Cl.
*G06K 9/00* (2006.01)
(52) U.S. Cl. ..................................... 382/124
(58) Field of Classification Search ................ 382/115, 382/124–127; 340/5.53; 348/77–78; 707/6, 707/9; 902/3, 6; 713/186, 200
See application file for complete search history.

(56) References Cited

U.S. PATENT DOCUMENTS

| | | | |
|---|---|---|---|
| 5,177,802 A | 1/1993 | Fujimoto et al. | |
| 5,351,303 A | 9/1994 | Willmore | |
| 5,526,436 A | 6/1996 | Sekiya | |
| D382,862 S | 8/1997 | Nakayama et al. | |
| 5,787,185 A | 7/1998 | Clayden | |
| 5,818,956 A * | 10/1998 | Tuli | 382/126 |
| 5,910,816 A * | 6/1999 | Fontenot et al. | 348/65 |
| 6,055,322 A | 4/2000 | Salganicoff et al. | |
| 6,088,470 A | 7/2000 | Camus et al. | |
| 6,289,114 B1 | 9/2001 | Mainguet | |
| 6,301,375 B1 | 10/2001 | Choi | |
| 6,324,296 B1 * | 11/2001 | McSheery et al. | 382/107 |
| 6,404,904 B1 | 6/2002 | Einighammer et al. | |

(Continued)

FOREIGN PATENT DOCUMENTS

DE 19818229 10/1999

(Continued)

*Primary Examiner*—Brian Q Le
(74) *Attorney, Agent, or Firm*—Mattingly & Malur, P.C.

(57) ABSTRACT

A compact authentication device that prevents user from feeling pressure and is strong against external light, when capturing an image of a finger blood vessel pattern with transmitted light. The device includes a guidance part for determining the finger position, a light source disposed on at least one side of the guidance part to emit light to be transmitted though the finger, an image capture part for capturing the transmitted light, a shading unit for limiting an irradiation region of the light, a finger thickness measuring unit, a unit for controlling a light amount of the light source based on a result of the measurement, a unit for recording registered image patterns of the finger, a unit for collating a captured image pattern from the image capture part with the registered patterns, and a unit for controlling different processing according to the collation result.

13 Claims, 13 Drawing Sheets

U.S. PATENT DOCUMENTS

| | | |
|---|---|---|
| 6,459,804 B2 | 10/2002 | Mainguet |
| 6,668,071 B1 | 12/2003 | Minkin et al. |
| 6,668,072 B1 | 12/2003 | Hribernig et al. |
| 6,813,010 B2 | 11/2004 | Kono et al. |
| 6,889,075 B2 | 5/2005 | Marchitto et al. |
| 2002/0028004 A1 | 3/2002 | Miura et al. |
| 2002/0048014 A1 | 4/2002 | Kono et al. |
| 2003/0016345 A1 | 1/2003 | Nagasaka et al. |
| 2003/0103686 A1 | 6/2003 | Ogura |
| 2004/0252867 A1* | 12/2004 | Lan et al. .................. 382/124 |

FOREIGN PATENT DOCUMENTS

| | | |
|---|---|---|
| JP | 01-223576 | 9/1989 |
| JP | 11-203478 | 7/1999 |
| JP | 11203452 | 7/1999 |
| JP | 2001000422 | 1/2001 |
| JP | 2001-242952 | 9/2001 |
| JP | 2002-83298 | 3/2002 |
| JP | 2002345953 | 12/2002 |
| JP | 200303063 2 A | 1/2003 |

\* cited by examiner

PERSONAL AUTHENTICATION DEVICE

The above-referenced patent application is a continuation application of U.S. Ser. No. 11/812,546, filed Jun. 20, 2007 which is a continuation application of U.S. Ser. No. 10/617,828, filed Jul. 14, 2003, now U.S. Pat. No. 7,245,745, which is hereby incorporated by reference into this application.

BACKGROUND OF THE INVENTION

The present invention relates to a personal authentication device using a living body, and in particular a living body personal authentication device based on a blood vessel pattern of a finger.

As a highly convenient security method that does not require to carry a key or the like and reduces the risk of illegal use due to loss or a theft, living body authentication using a part of a personal body, such as a fingerprint, iris, or a blood vessel pattern, as a key is attracting attention. Among them, an authentication method using a blood vessel pattern brings about little rejection symptom. Because the authentication method does not remind us of crime investigation unlike the fingerprint, and an eyeball is not directly exposed to light unlike the iris. Furthermore, since the blood vessel pattern is not a living body surface, which can be easily absorbed, but is an internal feature, the authentication method using the blood vessel pattern has an advantage that forgery is difficult.

Such a blood vessel pattern within a living body is obtained by illuminating a subject region with a infrared light source and capturing an image thereof with an image capture system, such as a camera or an image sensor, having sensitivity to infrared light. Since hemoglobin in blood absorbs infrared light well, light is absorbed in the blood vessel portion and the blood vessel portion appears dark in the image as compared with peripheral tissues. A pattern obtained by a difference between the brightness and darkness becomes the blood vessel pattern.

There are two methods for capturing an image of the blood vessel pattern. One of the two methods is a reflection method of capturing reflected light. The other of the two methods is a transmission method of capturing transmitted light obtained by illumination from the back. Such an authentication device is disclosed in, for example, JP-A-2002-083298.

In the reflection method, the light source and an image capture system can be disposed on the same side as one body. Thus, the reflection method has an advantage that the device is housed compactly and the space located across the finger from the device is not occupied, resulting in openness. In the case where reflected light is captured, however, light emitted from the light source is reflected by the epidermis not a little. The strength of light that arrives at the vicinity of the blood vessel located in the subcuteneous tissue, which is located under the epidermis, and is reflected becomes relatively weak. Therefore, the captured image lacks pattern clearness. As a result, it is difficult to obtain a pattern having repeatability, unless the blood vessel is clear to such a degree that visual recognition is possible even under the visible light, like a vein located in back of a hand having thin epidermis. This means that the pattern can be reproduced easily, and there is a serious problem as a security technique in the aspect of forgery resistance. In addition, because of the property that reflection of light from the epidermis is intense, the influence of a change of the skin surface, such as an injury, skin chapping, or wrinkles, on the captured image is inevitably great.

On the other hand, in the transmission method, there is a limit in the thickness of a living body through which light can be transmitted. However, light emitted from the light source and reflected by the epidermis is returned only to the light source side, and the image capture system is not affected. The finger has just a thickness through which light can be transmitted. In particular, as for the blood vessel pattern located on the palm side, the blood vessel itself is thin, and the epidermis is also thick as compared with the back. Even if an image of the blood vessel pattern is captured by a camera, therefore, the transmission method is excellent in forgery resistance.

For capturing the transmitted light, however, it is necessary to interpose the finger between the light source and the image capture system. If the light source part, the finger, and the camera part are arranged in a vertical straight line in the cited order as shown in FIG. 9, therefore, the light source part hides the finger as if it is a cover, when seen from the position of the eye at the time of operation. The authenticating user feels pressure because the user cannot see the finger. Furthermore, if an operation button or the like is disposed in the finger tip position, the user might waver in grasping the button position. On the other hand, if the light source part, the finger, and the camera part are arranged in a horizontal straight line as shown in FIG. 10, then there isn't anything, such as a cover, for hiding the top portion, and the finger can be seen from the viewpoint position. However, there is a problem that the hand that can be used for authentication is limited to the left hand or the right hand according to the position relation between the light source and the camera. FIG. 10 shows the case where the light source is disposed on the right side. If the hand is the right hand, then it is easy to turn the palm side of the finger toward the camera part. In the case of the left hand, however, it is necessary to forcibly wrench the arm to turn the palm side toward the camera part. In other words, in an authentication device having a camera part on the left side and a light source part on the right side, authentication other than that using the right hand is not practical. In the case of the opposite arrangement, authentication using the left hand is compelled. Of course, it is conceivable to prepare two sets each including a light source and a camera, symmetrically so as to be associated with the right hand and left hand, respectively. However, there are many problems, such as a cost increase and necessity of camera switching.

As a solution to the problems, a method shown in FIG. 12 is conceivable. In this method, the light source, the finger and the image capture system are arranged in a vertical direction, but they are not arranged simply in the vertical direction. Light sources are disposed obliquely above the finger in the tilted state. As a result, the finger is not hidden from the eye position at the time of operation and the feeling of pressure can be mitigated, as compared with the conventional vertical alignment method shown in FIG. 11. In addition, it is not necessary to limit the hand to be used for authentication to the left or right hand.

Even if the light sources are disposed obliquely above the finger, however, side walls for supporting the light sources having the conventional height are needed, and feeling of pressure is left not a little. In addition, the size of the entire device scarcely changes. Of course, if the side walls are made lower, then the feeling of pressure is eliminated. Even in this case, light emitted from the light source to side faces of the finger is scattered inside, and consequently the light also reaches the palm side of the finger, which is not on the straight line in the incidence direction. In other words, transmitted light exists on the palm side of the finger in the same way as the case where the light source is disposed on the back side of the finger. If the light sources are disposed in low positions, however, light strikes directly palm side portions and the light is reflected. For the same reason as that in the reflection method, it becomes difficult to obtain a blood vessel pattern from each of the palm side portions. Since the amount of light reflected by the side face of the finger is large, regions in which the brightness is saturated at its maximum value are formed in the captured image and parts of the blood vessel pattern are lost, as shown in FIG. 13 as a typical example. If the output strength of the light sources is adjusted, then the area of each of the saturated regions can be restrained to be small. In that case, however, the light amount reaching the vicinity of the center on the palm surface of the finger conversely becomes insufficient, resulting in a problem that the blood vessel pattern cannot be obtained. In other words, unless the ratio of the reflected light to the transmitted light is suitably adjusted, a correct blood vessel pattern is not obtained. If the side walls are low, then external light other than the light emitted from the light sources also strikes directly the side face of the finger sideward or obliquely. This becomes a cause of aggravation in the authentication performance under the strong external light, such as the setting sunlight.

SUMMARY OF THE INVENTION

An object of the present invention is to provide a compact authentication device that prevents the user from feeling pressure and that is strong against the external light, when capturing an image of a finger blood vessel pattern by using the transmitted light.

Another object of the present invention is to reduce the saturated regions in the pattern obtained by capturing an image of the finger, and thereby provide a clear finger blood vessel pattern, in the case where light sources are disposed in the finger side face direction.

In order to achieve the objects, a typical example of the present invention disclosed in the present application will now be described roughly.

A personal authentication device includes a light source for emitting light to be transmitted through a finger, an image capture part for capturing transmitted light obtained by applying the light emitted from the light source, and a unit for adjusting light amounts of the transmitted light from the finger and reflected light from side faces of the finger.

Specifically, a shading unit limits an irradiation region as a unit for changing the light amounts. Or light from a light source having a strong directivity, such as a laser, is focused on an upper side of the finger. Such a configuration will be disclosed.

Other objects, features and advantages of the invention will become apparent from the following description of the embodiments of the invention taken in conjunction with the accompanying drawings.

DESCRIPTION OF THE EMBODIMENTS

Hereafter, an embodiment of the present invention will be described in detail.

Herein, a lower side of a finger means a surface of a palm side or an image capture part, and an upper side of a finger means a back side of a hand and a surface opposite to the surface of the image capture part. A side face of a finger means a surface of the finger other than the palm side and the back side of the finger, or a surface other than the upper side and the lower side.

Herein, transmitted light means light that is transmitted through the inside of a finger, and the term "transmitted light" is used in meaning as distinguished from light reflected by the surface of the skin or the epidermis.

Figure 13:
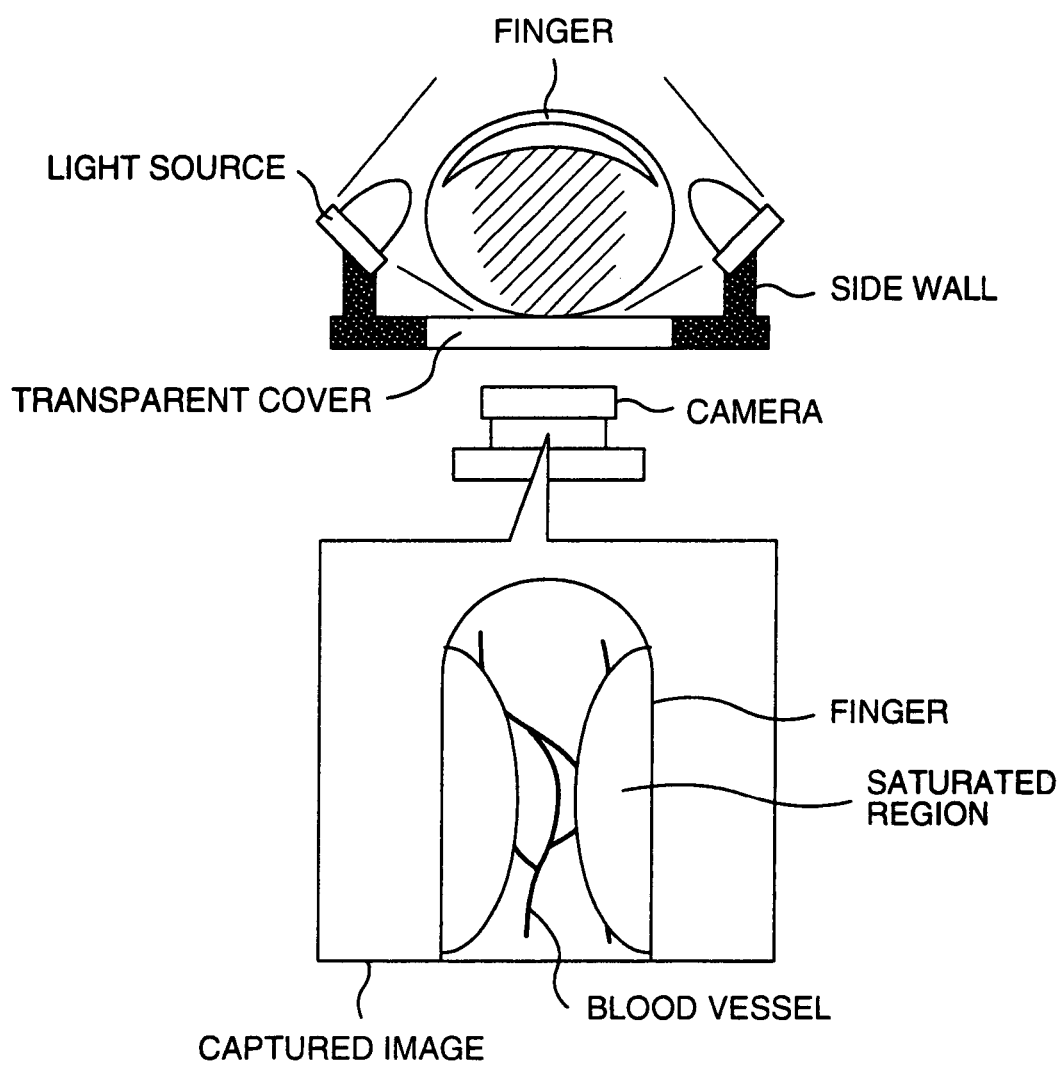
FIG. 13 is a schematic diagram showing a change of a captured image according to a light source position.
Figure 14:
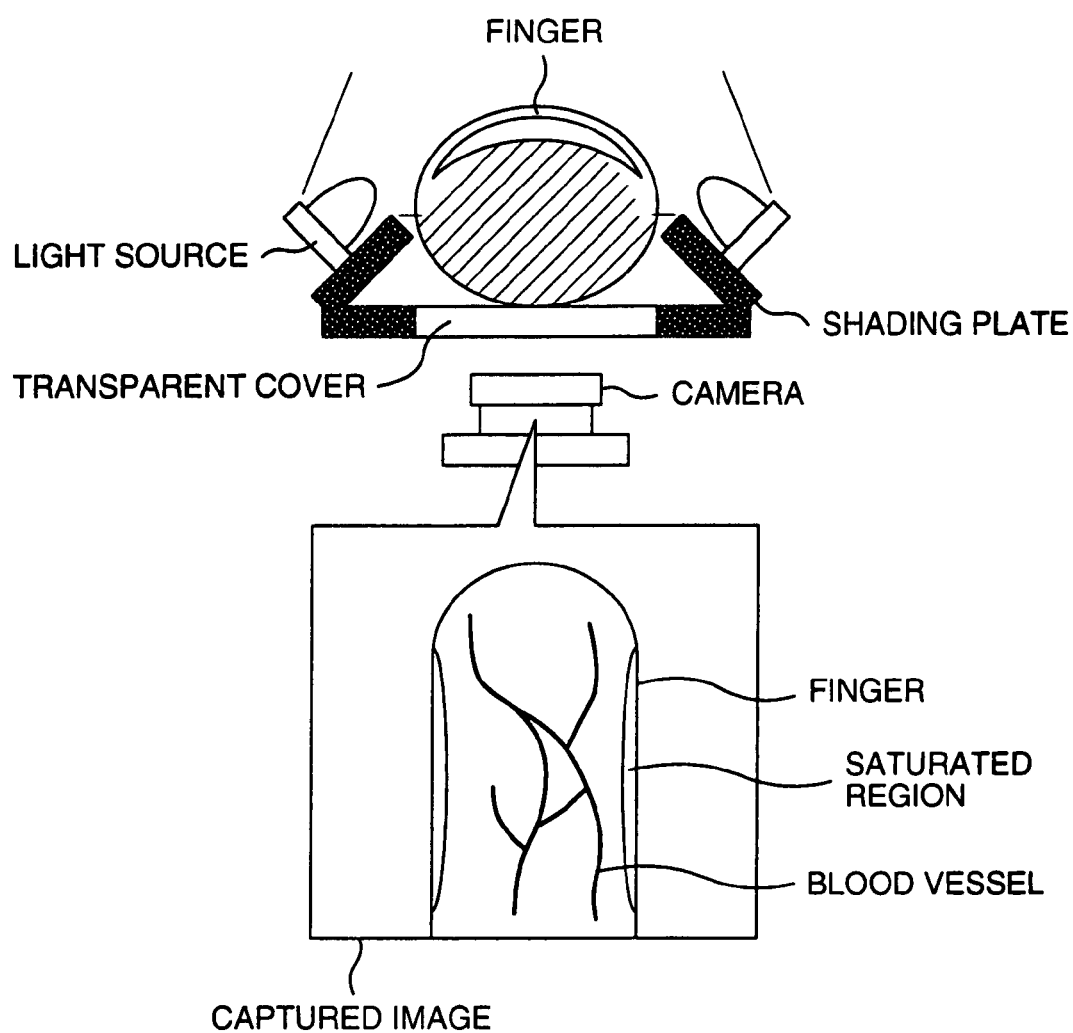
FIG. 14 is a schematic diagram showing a change of a captured image according to a light source position.

The saturated regions in the sides of the finger as typically shown in FIG. 13 are caused by light emitted from the light source and reflected directly by the surface of the skin arriving at the camera. Unless the ratio of the reflected light to the transmitted light is adjusted suitably, a correct blood vessel pattern is not obtained. Hereafter, a solution according to the present invention will be described.

Figure 1:
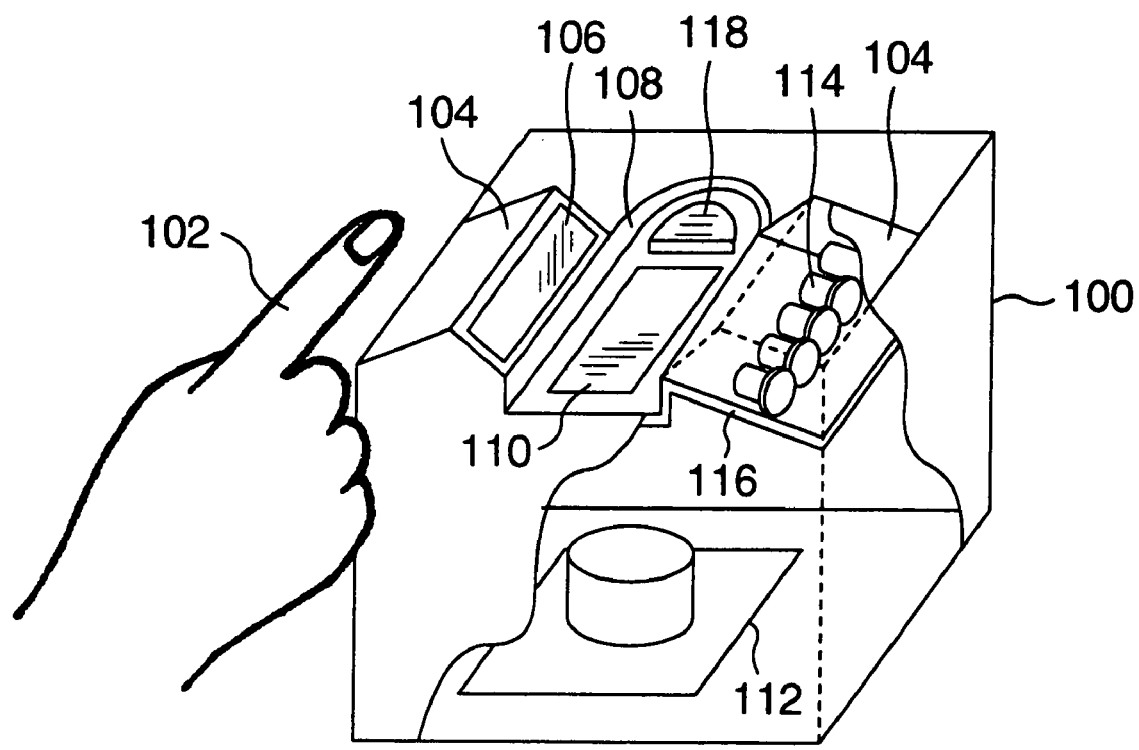
FIG. 1 shows an example of a device form according to the present invention.

FIG. 1 is a schematic diagram of an authentication device according to the present invention. On an upper side of a main body, there is a guide groove 108 for exhibiting a place on which a finger 102 should be placed in an intuitively understandable form. Light source parts 104 are disposed on the left side and the right of the guide groove 108. The guide groove functions also as low side walls that hide the lower side of the finger. Light sources are disposed within the device. Upper sides of the light sources are covered. Light is applied to the finger placed on the guide groove 108 through a light source opening part 106. The covers disposed over the light sources also play a role in preventing light scattered outside of the desired irradiation direction from being reflected by fingers or the palm other than the authentication finger and affecting the image capture as disturbance light. If the finger is placed so as to be aligned with the guide groove 108, then there is a button switch 118 in a position corresponding to the finger tip, and there is an image capture opening part 110 in a position corresponding to regions located before and behind the first and second joints of the finger. In this way, an image of the finger can be captured by a camera (image capture part) 112 disposed under the image capture opening part 110. A filter for passing only the wave length of the infrared region is mounted on the camera (image capture part) 112 to restrain the influence of light in the visible light region and capture an image of a blood vessel pattern clearly. The image capture opening part 110 is covered by transparent glass or acrylic plate together with the light source opening part 106 in order to pass light and prevent foreign substances from getting in the authentication device. By using a plate of an optical filter that passes only light in the infrared region instead of the glass or acrylic plate, two functions, i.e., device protection and visible light reduction can also be put together in one sheet of plate. Furthermore, the chassis can be formed of an optical filter material integrally with the light source opening part and the image capture opening part.

The saturated regions in the side faces of the finger as shown in FIG. 13 are generated by the fact that light emitted from the light source and reflected directly by the surface of the skin arrives at the camera. In other words, the saturated regions can be made smaller by absolutely or relatively restraining the amount of light applied to the palm side of the finger, i.e., the lower part of the finger in FIG. 13. In the present invention, therefore, the amount of light irradiated on a specific region (especially the upper side of the finger) is adjusted, and thereby the area of the region saturated in brightness is reduced even in an image captured by using the side face radiation method. The problem that a part of the blood vessel pattern is lost is thus solved. For example, the intensity and the amount of light irradiated on the upper part of the finger are increased.

Specifically, within each of the light source parts shown in FIG. 1, a light source 114 for emitting infrared light is mounted on a shading plate 116. The shading plate prevents light from traveling to the lower side of the finger, and serves as a yardstick of the position in which the finger is placed. The shading plate serves as a part of the guide groove as well. By making the plane of the shading plate nearly coincide with an optical axis of the light source and turn the optical axis toward the upper side of the finger, it becomes possible to shade light from the lower side of the finger while efficiently using the strongest light portion of the light source. If the slant of the shading plate is made sufficient and the light source is placed on the bottom end side, then the light source is housed in a position lower than that of the guide groove, and the device can be made thin. At this time, the guide groove including parts of the shield plates is subjected to surface treatment using a lusterless paint, material or pattern in order to prevent light reflected by the back side, i.e., the upper side of the finger from being reflected by the guide groove again and applied to the side face of the finger. If the range in which the irradiation of light is restrained is approximately ½ to ⅔ from the image capture part face as compared with the width of the finger seen from the side face of the finger, then an experimentally clear blood vessel pattern is obtained.

Herein, a direction pointed from the palm side of the finger to the back side direction in the case where the side face of the finger, which is neither the palm side nor the back side, is seen is referred to as height direction. A direction pointed from a tip to a root of the finger is referred to as width direction. Data measured when the shading area of the finger side face is changed in the height direction from the plane of the image capture part with the finger width in the width direction fixed are shown in FIG. 17.

Figure 17:
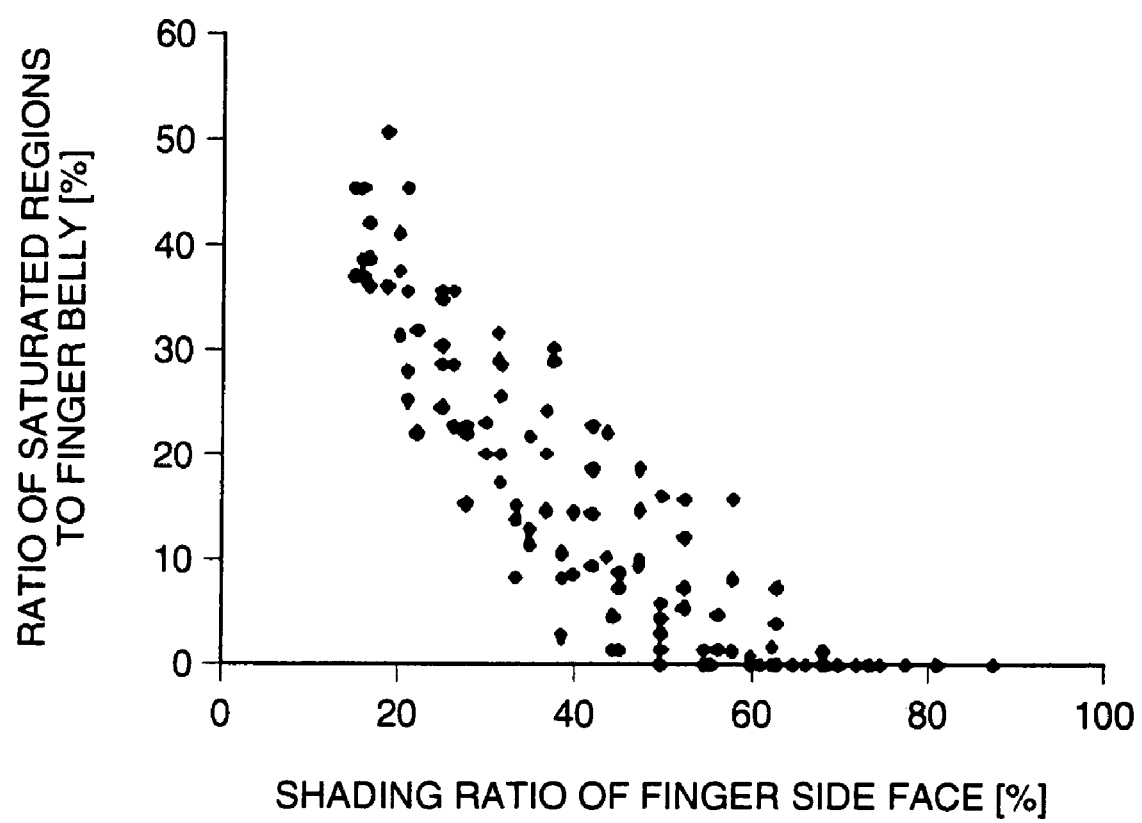
FIG. 17 shows data showing relations between a shading ratio and a saturated region.

FIG. 17 shows data obtained by measuring the relation between the ratio of the range in which the light irradiation is restrained to the entire side face of the finger (shading ratio of the finger side face) and the ratio of the saturated regions to the image capture part face of the finger (ratio of the saturated regions to the finger belly), with respect to twelve subject fingers.

It will be appreciated from this graph that there are slight variations due to individual difference. In the case where the finger side face region of approximately ⅔ from the image capture part face is shaded, however, the saturated regions disappear. It will be appreciated that the saturated regions can be restrained to approximately 10% when the finger side face region of approximately ½ is shaded. If the light sources are disposed so as to apply light to the upper side of the finger side face as if the upper side is looked up from below, then the strength of light that reaches the lower side of the finger is restrained, resulting in a higher efficient. The elevation angle at that time can be obtained easily from a direction angle peculiar to the light source that indicates the degree of spread of light in the travel direction, and the above described ideal shading ratio of the finger side face.

Even if the shading plate serving as a structure is not used, reflection from the lower side can also be restrained by focusing light from a light source having strong directivity, such as a laser, on the upper half of the finger although the cost becomes slightly higher. Even if the light sources are unchanged, it is also possible to control the irradiation direction so as to restrain the irradiation direction only to the upper side of the finger, or dispose a deflection plate immediately before the image capture system to weaken light only in the direction peculiar to the reflected light. In addition, there is also a method of acquiring an image with the influence of the reflection from the lower side being relatively restrained, not by physically weakening the reflection from the lower side of the finger, but on the contrary, by applying stronger light to the upper side.

As heretofore described, it becomes possible to obtain a clear blood vessel pattern by providing a unit for adjusting amounts of light respectively irradiated on regions of the upper side and the lower side of the finger to optimum amounts, even if the position of the light source is not restrained to right above the finger. In the present embodiment, the unit for irradiating light to the upper side of the finger and shading light directed to the lower side is provided. However, the conception of the present invention is not strictly limited only to the upper side and the lower side. It is a matter of course that the conception of the present invention is to irradiate light to a region of the finger required for obtaining an image capture pattern of a vein and relatively restrain the amount of light directed to other regions of the finger.

The user place the finger on the guide groove 108 and presses the button switch 118. Thereupon, authentication is started. However, the button switch is not indispensable, but the fact the finger has been placed on the guide groove correctly may be sensed by using other means. For example, a touch sensor using a change of electrostatic capacity or an electro-conductivity of a living body may also be used. Or it is also possible to monitor an image captured by the camera 112 in real time and detect the fact that the finger has been placed by using image processing. In the case of the touch sensor, however, the user does not always respond in such a state that authentication is ready, and consequently care is needed. By using the button switch, the user can explicitly determine the start timing of the authentication processing, and the authentication system can be maintained in the standby state until the button is pressed. This results in an advantage that power consumption can be reduced. In addition, the authentication function can be naturally added to a conventional device that has conducted some operation by using a button switch, without compelling the user to alter the operation procedure. The button switch in this case is not limited to a mechanical switch. For example, anything, such as a pressure sensor, may be used so long as contact is not caused until the user intentionally operates it.

The precision of the personal authentication can also be improved by mounting a pressure sensor, apart from the button switch, on the transparent plate of the image capture opening part 110. If strong pressure is applied to a blood vessel of a living human being, then the blood vessel is crushed and spread. In other words, lines in the vein pattern become thick. If pressure is further applied, then the blood flow is stopped and the blood vessel is lost to sight. If the fact that such sequential changes peculiar to a living body are seen in the captured image when the pressure sensor responds is handled as a precondition for authentication, then identity theft using a forged finger becomes very difficult and the safety is increased. For authentication, an image obtained before the blood vessel pattern is lost to sight is stored in a buffer memory or the like, or an image obtained after the finger is detached and the blood vessel pattern is in sight again is captured and used. In a method of always monitoring the sequential changes according to the image and using the changes as timing for authentication, the pressure sensor is not needed.

Figure 2:
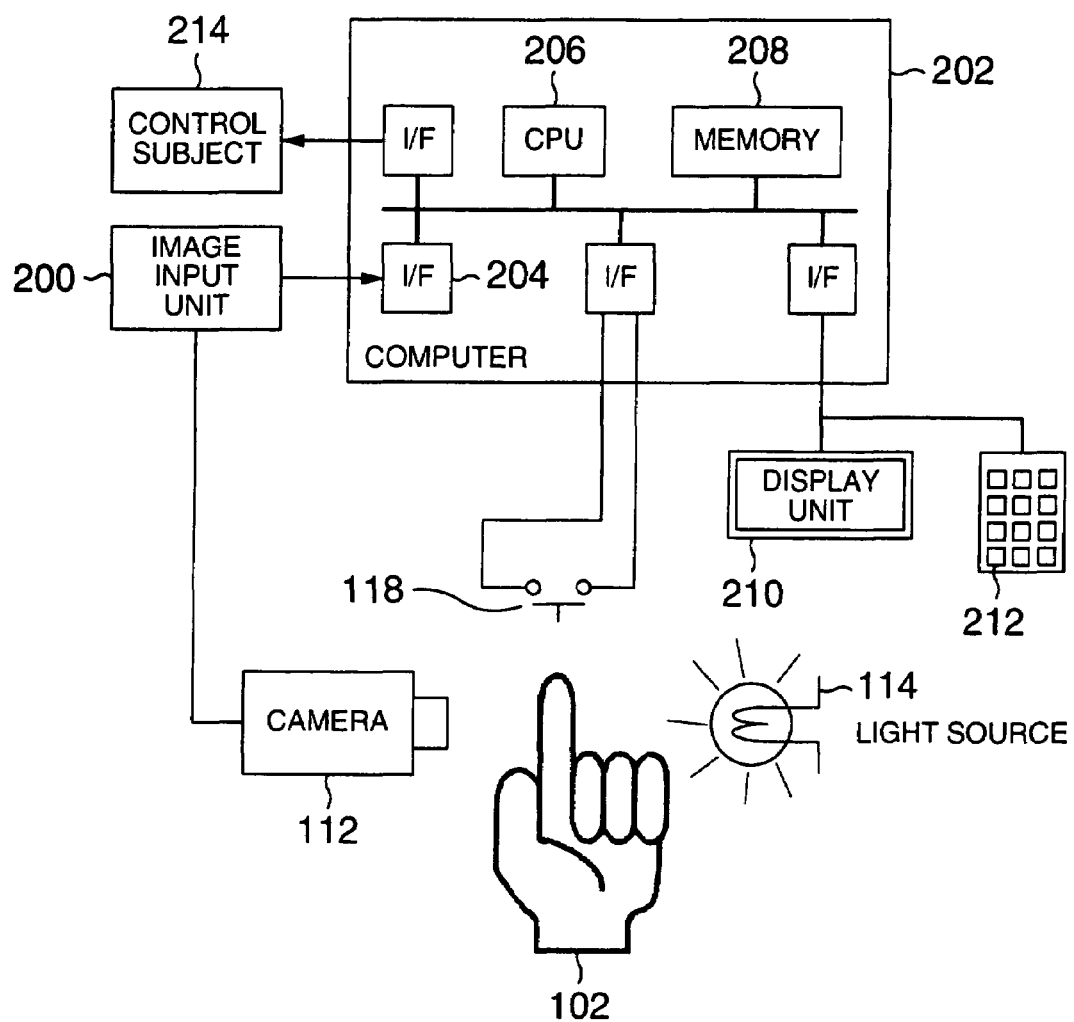
FIG. 2 shows an example of a device system configuration according to the present invention.

FIG. 2 shows an example of a schematic block diagram of a system configuration according to the present invention. The finger 102 is interposed between a light source 114 and the camera 112, and an image signal of a blood vessel pattern is acquired in response to push of the switch 118. The image signal of the camera 112 is converted to digital data by an image input unit 200. The digital data is stored in a memory 208 via an input/output interface 204 in a computer 202. The switch 118 is also connected via an input/output interface in the same way. The on/off state of the switch 118 is stored in the memory 208. Or the same time that the switch 118 turns on, an interrupt signal is issued to a CPU 206. Upon ascertaining that the state of the switch 118 has turned on, or upon sensing the interrupt signal, a CPU 206 starts and executes a software program for authentication. On the basis of a result of processing of the program, the CPU 206 conducts various kinds of processing, such as displaying the result on a display unit 210, or sending a suitable signal to a control subject 214 to open or close a door. A keyboard 212 is used to, for example, input auxiliary information concerning authentication, such as a secret number.

Furthermore, in a personal authentication system, it is also possible to conduct various kinds of processing according to a collation result between a vein pattern captured by the image capture part and a registered pattern.

Figure 3:
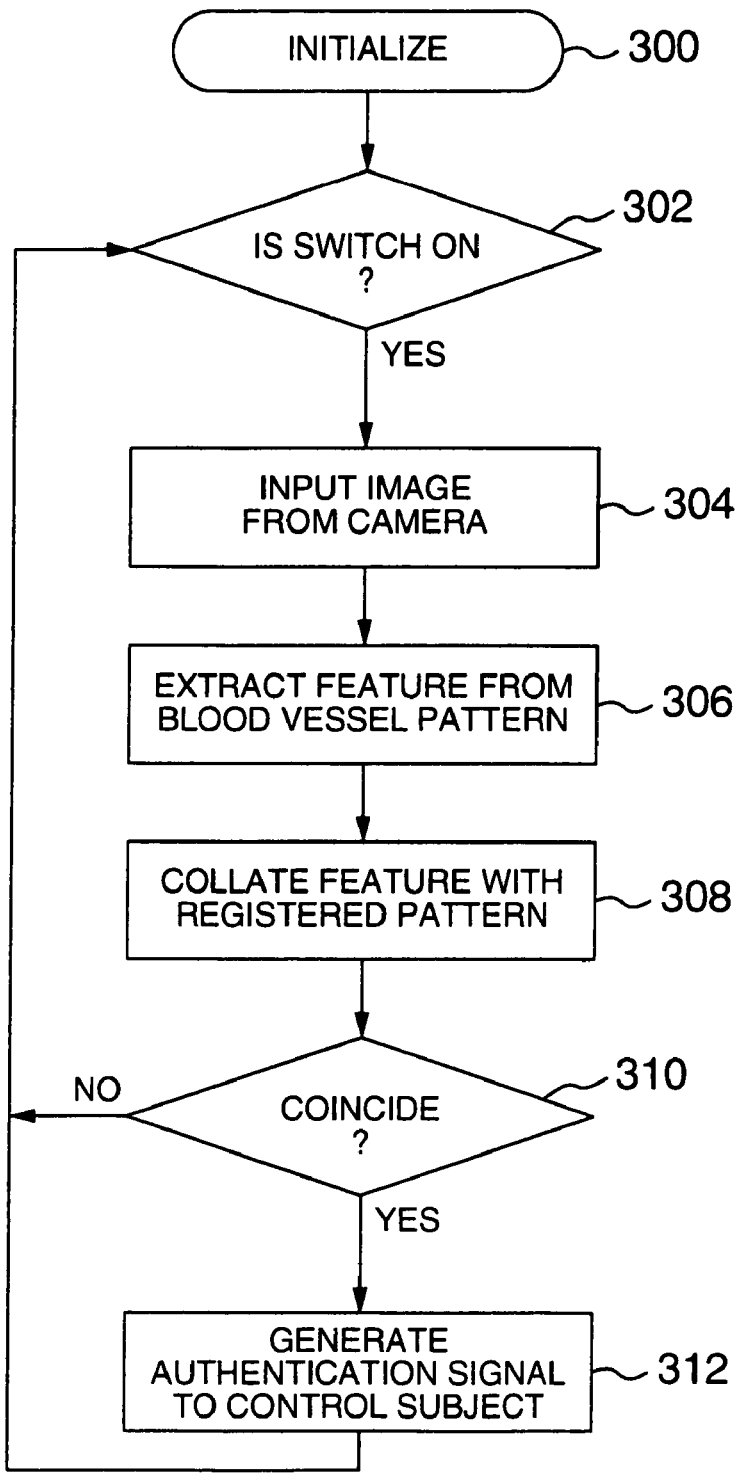
FIG. 3 shows an example of a software flow according to the present invention.

FIG. 3 shows an example of a software flow executed by the above described hardware, especially the CPU 206. In step 300, the whole hardware is initialized and initial values are substituted into temporary variables needed to execute the program. If the shift to the initial state is completed, the program comes in the idling state, and waits for the switch 118 to turn on (step 302). If the switch turns on, then an image of the finger captured by the camera 112 is taken into the memory 208 (step 304). Image processing is conducted on the image data thus taken in, and a feature of the blood vessel pattern is extracted (step 306). A collation search is conducted to determine whether there is a pattern that coincides with an already registered pattern (step 308). The registered pattern is registered previously as follows. Prior to authentication, a legal registrant conducts the steps as far as the step 306 in the same way, and then stores data in the memory 208 in association with information that identifies the registrant. The data thus stored is the registered pattern. As for the memory for registering the pattern, it is also possible to use a nonvolatile memory, in which information is not lost by switching power supply, apart from the memory for processing execution. A recording medium, such as a hard disk, may be used for the same purpose. If there is a coinciding pattern (step 310), then a signal to the effect that a legal access right has been authenticated to a control subject, such as a device or a software program, that needs authentication, or authenticated personal identification data is transmitted (step 312). If a coinciding pattern is not found, then any signal is not transmitted, or a signal to the effect that illegal access has been performed is transmitted as occasion demands. And the standby state is continued until the switch turns on next time.

The thickness of the finger varies according to individuals. If the amount of light is uniform, therefore, the blood vessel pattern appears well in some persons, but it does not appear in others. The precision of authentication can be improved by continuously capturing an image with brightness changed while controlling power supply to the light source until the blood vessel pattern appears most favorably. As for the power supply control, for example, fast switching control, such as PWM (Pulse Width Modulation), using power transistors can be utilized. In addition, a sensor for measuring the finger thickness is added, then an optimum blood vessel pattern is obtained with a smaller number of captured images by previously calculating and storing the relation between the finger thickness and the optimum amount of light.

The individual difference of the finger thickness closely relates to the shading performance. The reason will now be described. If the finger is thick, then the height of the finger becomes considerably higher than the shading plate, and the area of the side face of the finger exceeding the shading plate becomes large. In this case, therefore, transmitted light can be absorbed sufficiently. On the other hand, a possibility that light strikes the lower side of the finger as well occurs. If the finger is thin, then the upper side of the finger does not exceed the height of the shading plate. Since in this case, the area of a region that light strikes is small, a possibility of insufficiency in amount of light occurs. In other words, in the case where the slant of the shading plate is fixed, shading for the lower side of the finger becomes insufficient if the finger is thick, whereas there is a risk of insufficiency in amount of light given to the upper side of the finger if the finger is thin. Therefore, the direction of the light source may be automatically adjusted according to the finger thickness by making the slant of the shading plate variable or using reflection from a movable mirror. As for detection of the optimum position in the case where automatic adjustment is conducted, it is possible, for example, to monitor an image captured by the camera in real time, obtain the area of the saturated regions of the side faces of the finger, and effect control so as to minimize the area in such a range that the blood vessel pattern appears clearly. It can be determined whether the blood vessel pattern is clear by determining whether the brightness ratio between a black line representing the blood vessel and a white portion representing peripheral tissues satisfies a certain fixed condition. The area of the saturated regions can be extracted as a region in which pixels having the maximum brightness value are consecutive beginning with the boundary vicinities of both sides of the finger. If the movable mechanism of the shading plate is further applied, then the light source parts 104, which swell like hills in FIG. 1, can be housed within the device chassis 100 except at the time of authentication. As a result, the device shape at the time of standby state is further thin and the projections are eliminated. For example, the device becomes suitable for mounting on a portable telephone or a personal digital assistant.

In addition, the saturated regions of the side faces of the finger can be made to appear successively only on one side by turning on the light sources disposed on both sides of the finger alternately. It is possible to obtain an image of the finger free of saturated regions by capturing two sheets of image respectively captured at timing of turning on the light sources, cutting out only half sheets of the image free of the saturated regions in the captured images of the finger, and combining the half sheets free of the saturated regions to form one sheet of image. In the case of this method, the shading plate also becomes unnecessary. However, there is also the following trade-off. Since two sheets must be captured in succession in accordance with turning on of the light sources, it takes slightly longer time. Since the two sheets of image are not always obtained with the same amount of light, a boundary between images becomes conspicuous in some cases. If smoothing is conducted so as not to make the boundary inconspicuous, then clearness of the image is lost in some cases.

Figure 4:
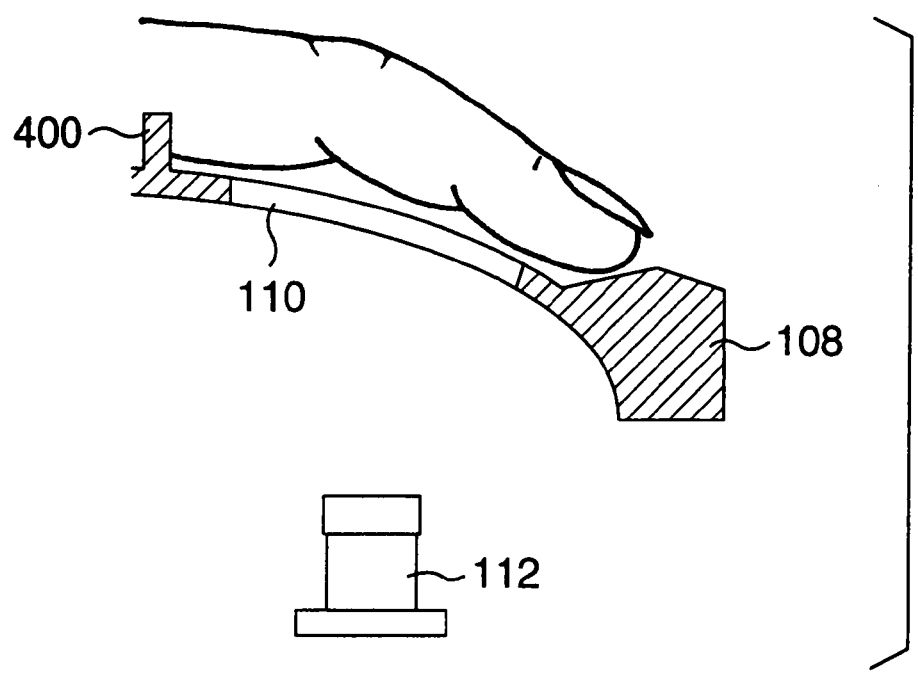
FIG. 4 shows an example of a sectional view of a finger insertion portion in a device.

FIG. 4 is an enlarged view obtained by watching the guide groove 108, on which the finger is placed, from the side face in a variation of the authentication device 100. On the bottom of the guide groove, there is the image capture opening part 110. Under the image capture opening part 110, there is a camera 112. The guide groove 108, on which the finger is placed, may be flat. As shown in FIG. 4, however, the guide groove 108, on which the finger is placed, may be designed to draw an arc from the image capture opening part 110 to a finger tip portion so that the finger will be naturally bent. If it is attempted to stretch the finger straightly, then resultant strain of the skin of the finger presses the blood vessel and obstructs flow of blood, and consequently the blood vessel pattern is not obtained in some cases. If the shape draws an arc as shown in FIG. 4, however, the finger is naturally bent, and consequently the blood vessel is not pressed. Furthermore, in the naturally bent state, the finger does not touch the surface of the transparent plate in the opening part 110. Since there is no contact with the surface of the transparent plate, neither the pressure of the blood vessel nor adhesion of stains is caused. Furthermore, by disposing the transparent plate included in the opening part 110 in a lower position, or forming a finger rest 400 in order to lift the root of the finger out of the opening part 110, it is also possible to more certainly prevent the blood vessel from being pressed by contact between the opening part 110 and the finger. Furthermore, by limiting the height of the guide groove in the finger tip portion so as to just house the belly portion of the finger tip therein, and opening the top part, even a person wearing fingernails long or wearing attached fingernails can place the finger in a predetermined position without inconvenience.

Figure 5:
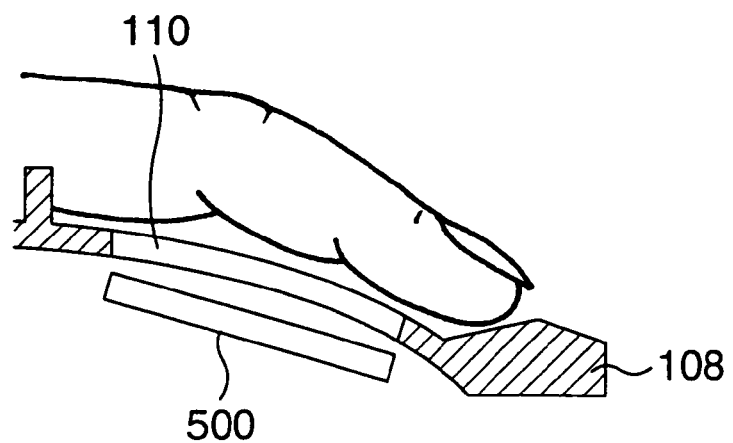
FIG. 5 shows an example of a device using a plane image capture system.

FIG. 5 shows an example of an authentication device made thin. In the above described device form, the camera is used to capture the image of the blood vessel pattern. Therefore, a focal length of a fixed length is necessary. In addition, since the camera itself has a considerable thickness because of a lens and so on, the chassis of the image capture part tends to be large. Therefore, the authentication device can be made thin by using a contact type image sensor. For example, as the contact type image sensor, an array formed by arranging phototransistors having sensitivity to infrared light in a lattice form is conceivable. By successively reading out values of the photo-transistors, two-dimensional image data are obtained in the same way as the camera. In the case of molding that draws an arc as shown in FIG. 5, it becomes possible to mount phototransistors according to the curvature of the arc by forming the phototransistors on a filmy flexible substrate. Furthermore, it is also possible to replace the transparent cover in the image capture opening part 110 by the phototransistors.

Figure 6:
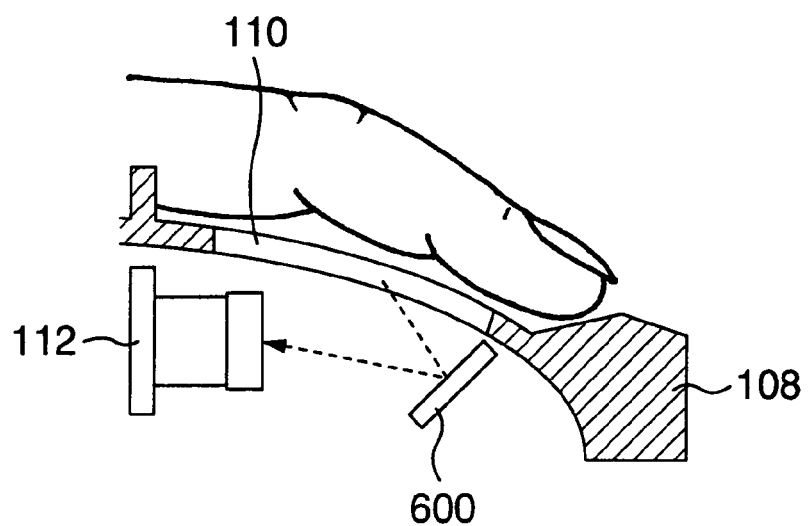
FIG. 6 shows an example of a device using a mirror when capturing an image.

FIG. 6 shows another example of the authentication device 100 made thin. By conducting camera image capture with a mirror 600 and thereby folding the travel path of light, it becomes possible to restrain the thickness of the chassis, without changing the focal length of FIG. 4.

Figure 7:
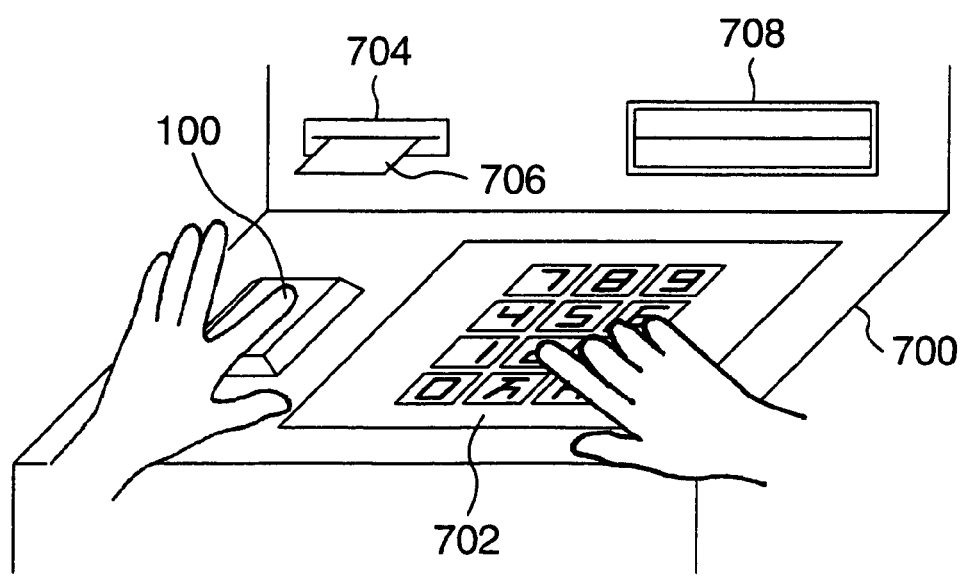
FIG. 7 shows an example of a device according to the present invention.

FIG. 7 shows an example in which the present invention has been applied to an ATM (Automatic Teller Machine) of a bank or the like. Numeral 700 denotes an ATM chassis. On a table-like operation plane, a display 702 having a touch panel and the authentication device 100 are disposed side by side. When drawing cash, the user first place a finger of one hand on a specified position of the authentication device 100. In that state, the user conducts operation, such as inputting an amount of money, with the other hand according to messages displayed on the display 702. The operation is conducted in parallel with the personal authentication. If authentication is attained, cash is output from a cash inlet/outlet 708. If authentication fails, then cash is not output, re-input is urged. If the number of times of mistake is large, the transactions are temporarily invalidated. Numeral 704 denotes a card slit. A cash card or a passbook 706 is inserted into the card slit 704 as occasion demands. When conducting personal authentication in a living body, the user is typically forced to conduct special operation causing stress, for authentication. For example, in the conventional authentication of a blood vessel pattern of a finger, the user is required to insert a finger into a hole or a deep groove with a rejection symptom. In fingerprint authentication, it is necessary to press the sensor part with force. In the case of iris authentication, the user must turn eyes to the sensor camera without winking. In the authentication device of the present invention, authentication becomes possible by only placing the finger softly according to a shallow groove, which gives feeling of opening. Therefore, it is hard to feel stress. Furthermore, since unreasonable force is not required, it is easy to conduct operation with one hand, while using the other hand for authentication. Even when an arithmetic operation device of lower cost is used or high precision authentication involving a larger amount of processing is conducted, it is possible to make the user unaware of the length of the processing time if the authentication processing is completed within the input operation time for the amount of money or the like.

Figure 8:
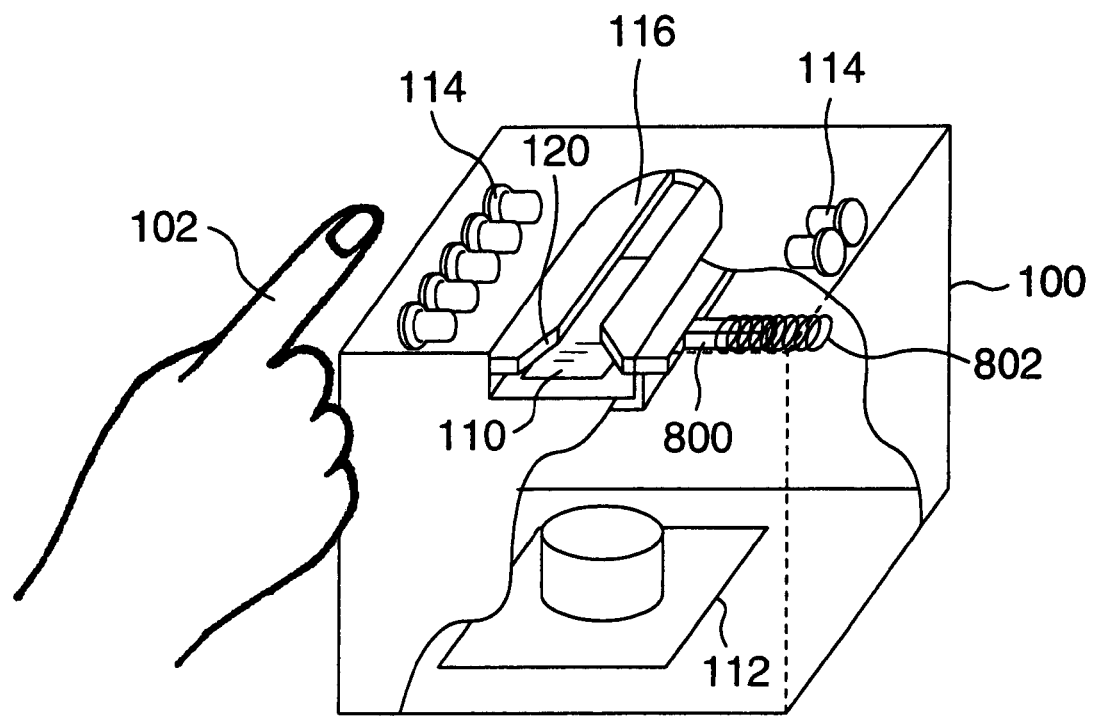
FIG. 8 shows another example of a device form according to the present invention.
Figure 9:
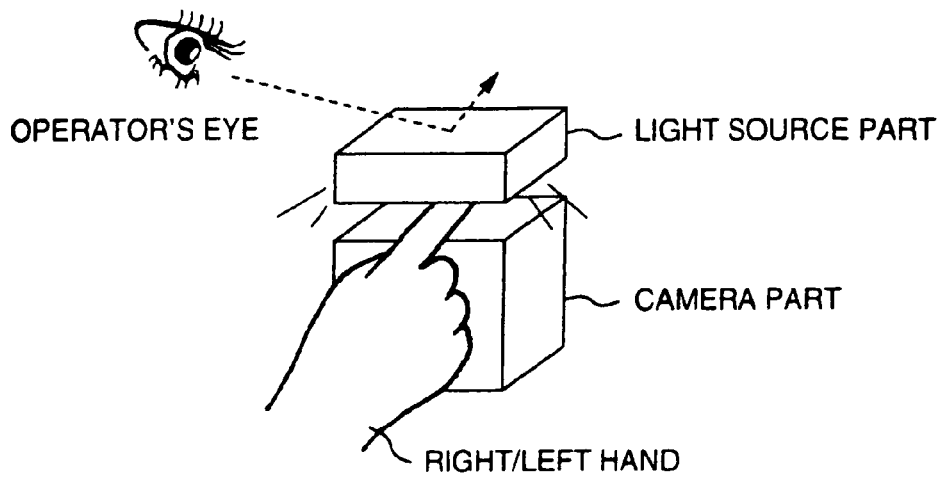
FIG. 9 is a schematic diagram showing problems of a conventional method.
Figure 10:
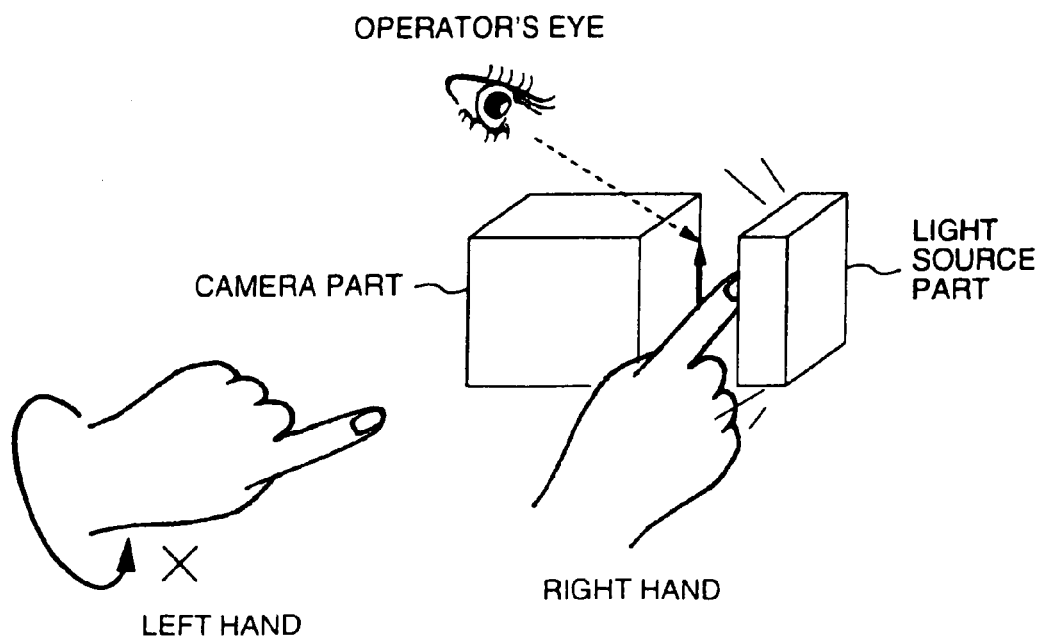
FIG. 10 is a schematic diagram showing problems of a conventional method.
Figure 11:
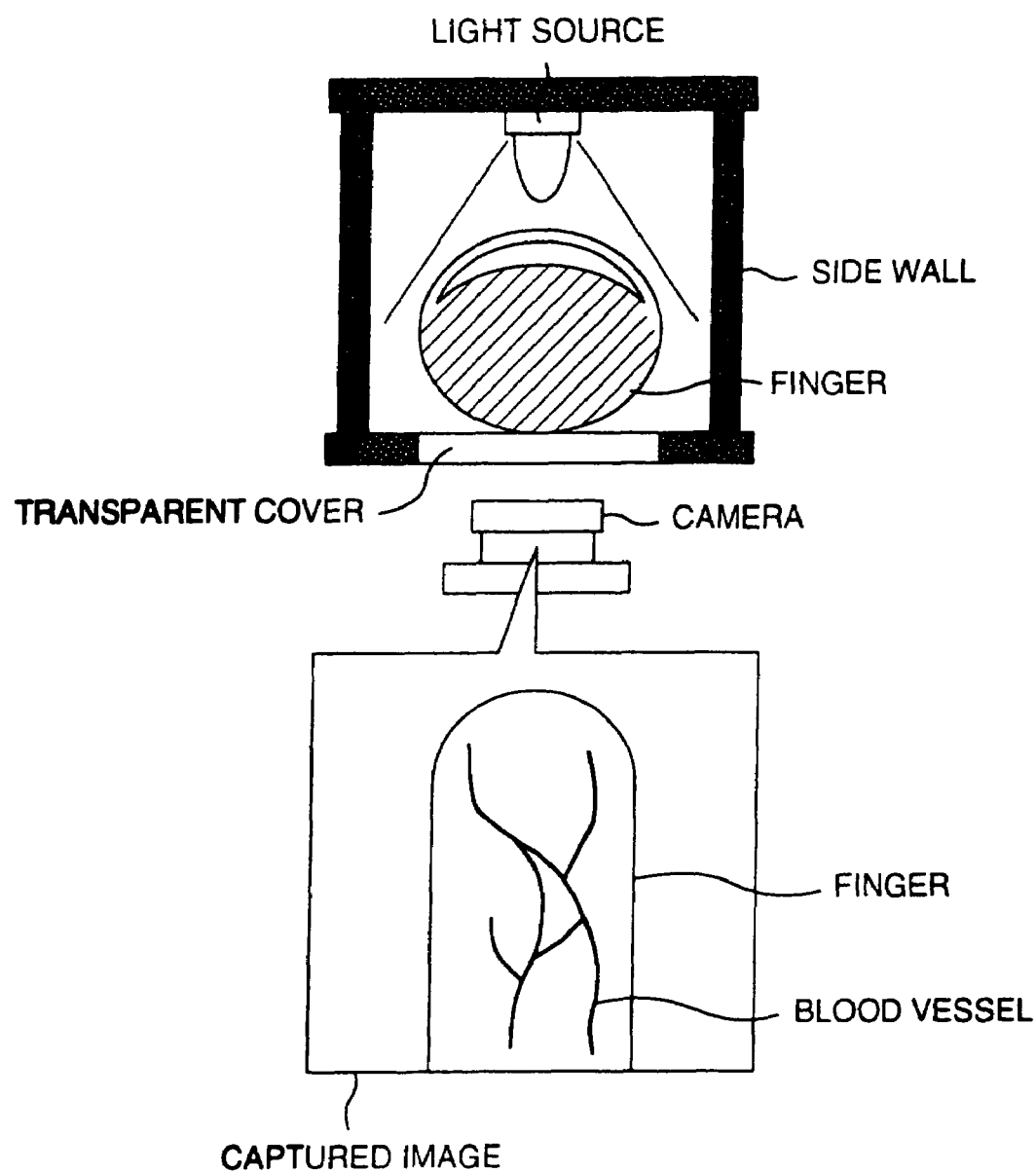
FIG. 11 is a schematic diagram showing a change of a captured image according to a light source position.
Figure 12:
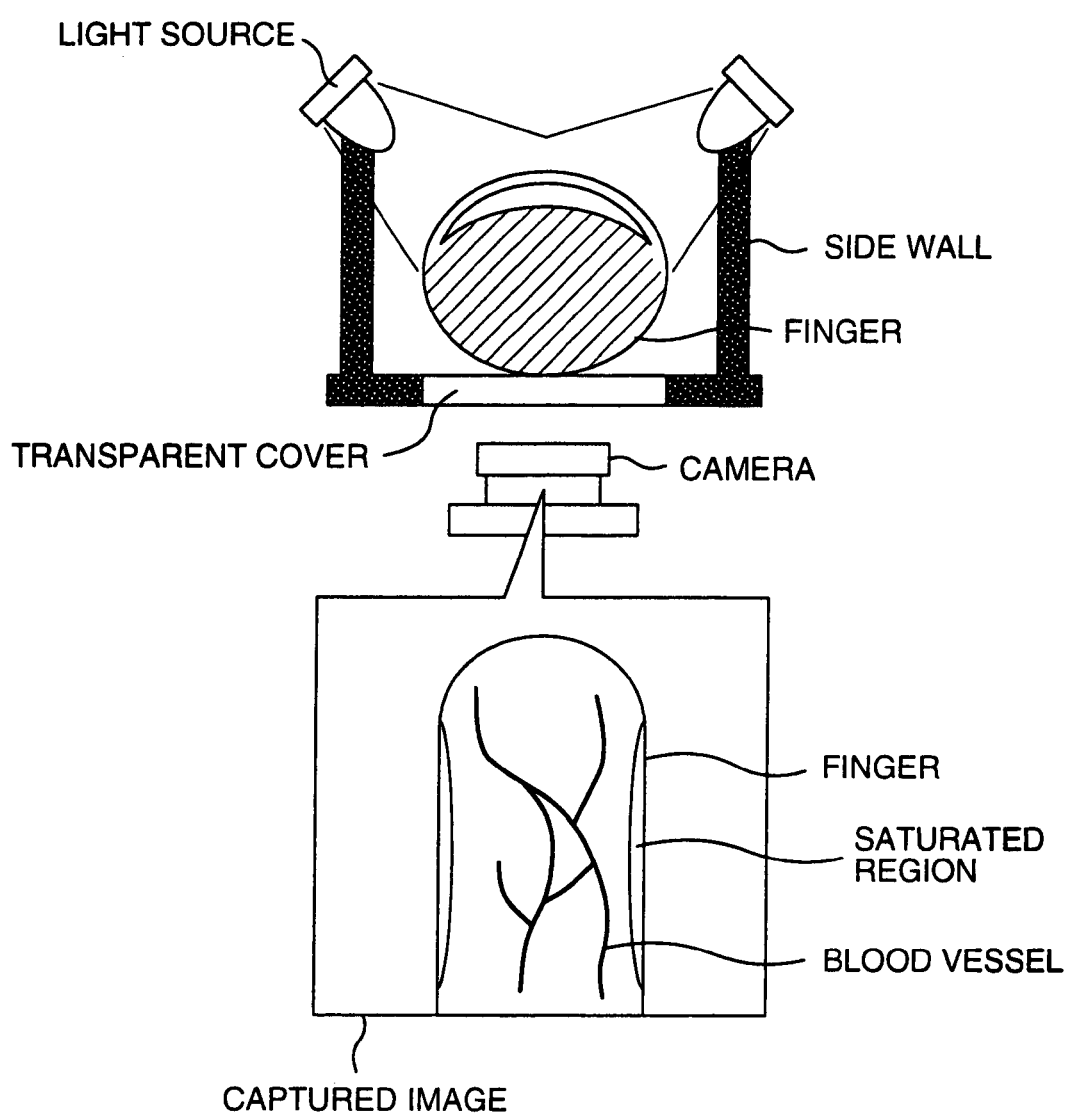
FIG. 12 is a schematic diagram showing a change of a captured image according to a light source position.

FIG. 8 shows another embodiment of the authentication device 100 according to the present invention. The shading plate 116 is integral with a rail 800. The rail 800 is linked to a spring 802. As a result, the shading plate 116 becomes movable so as to be absorbed into the light source side of the side face. Such a groove as to just hide the lower side of the finger is formed between the shading plate 116 and the image capture opening part 110. If the user attempts to place a finger on the image capture opening part at the time of authentication, then necessarily the shading plate is slid laterally. In this case, the spring 802 applies force to the shading plate to return it to the original position. As a result, the shading plate comes in close contact with the side face of the finger, and a higher shading effect for the lower side of the finger is demonstrated. If the user detaches the finger from the authentication device, then the shading plate is automatically returned to the original position by the spring, and the shading plate also functions to prevent dust and dirt of the image capture opening part 110. At this time, the shading plate can be smoothly slid by forming a notch 120 on this side of the shading plate and thereby slipping the finger from this side into the back side. Furthermore, when the user attempts the finger on the image capture opening part, it is also possible to guide the finger so as to position it in the center of the image capture opening part by effecting control with a combination of a rack and a pinion so as to make the travel amounts of the left and right shading plates equal. If the same finger is placed, the finger is placed in the same position whenever authentication is conducted owing to this guide function, resulting in a higher collation precision.

Figure 15:
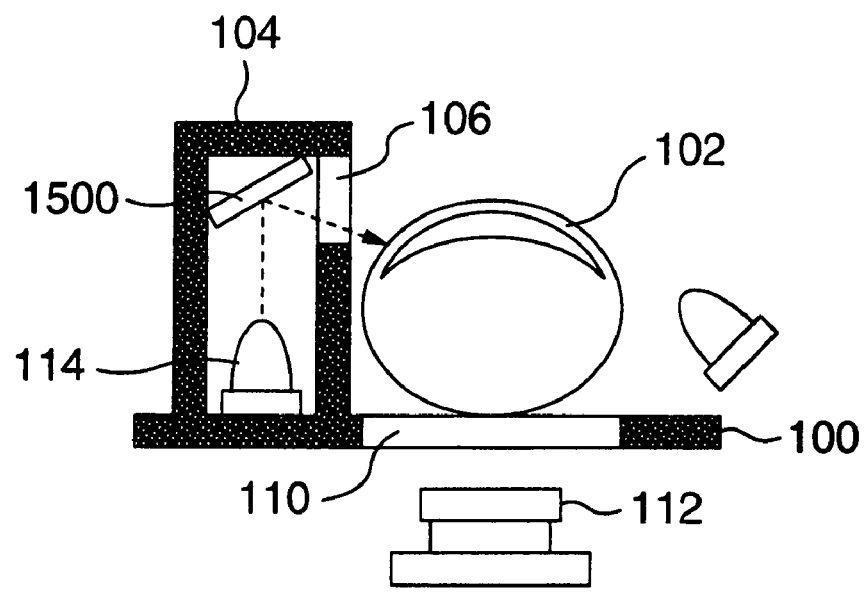
FIG. 15 shows an example of a device using a mirror as a light source.

FIG. 15 shows still another embodiment of the authentication device 100 according to the present invention. A schematic structure around a portion on which the finger is placed is shown. In the example of FIG. 15, light emitted from the light source is not applied directly to the finger, but the light emitted from the light source 114 is changed in direction by a mirror 1500 and then applied to the finger. As a result, the degree of freedom in the position of the light source, fixing method, and wiring can be further increased, and the height of the side wall can also be restrained.

Figure 16:
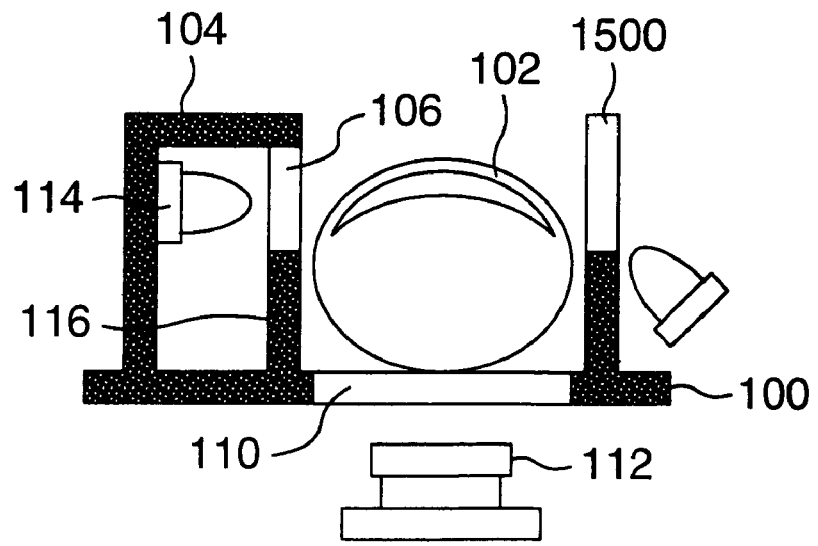
FIG. 16 shows an example of a device using a mirror as a light source.

In FIG. 16, the light source is disposed on one side of the finger, and the mirror 1500 is disposed on the other side of the finger. Light emitted from the light source 114 not only irradiates one side face of the finger, but also passes the finger and a space over the finger and arrives at the opposite side. This light can be reflected by the mirror and used as a light source for illuminating the opposite side face of the finger. As a result, power consumption can be restrained as compared with the case where a plurality of light sources are used.

Heretofore, examples in which light sources are disposed in two positions, i.e., on the left side and on the right side of the finger in order to obtain a uniform and accurate blood vessel pattern have been shown. However, the present invention is not limited thereto. If a necessary and sufficient performance is obtained, the light source may be disposed on only either the left side or right side. This brings about an advantage in cost.

The present invention is not limited to personal authentication, but may be combined with fingerprint authentication or the like. Since an image of the fingerprint of the fingertip is also captured by a common image capture system, highly accurate personal authentication using a plurality of living body features becomes possible without increasing the cost.

According to the present invention, light emitted from the light source or external light is applied to the lower side of the finger excessively. As a result, the image of the blood vessel pattern obtained by capturing transmitted light becomes clear, and the precision of the authentication can be improved.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A personal identification apparatus comprising:
    a light source for irradiating light to a hand,
    a light source opening placed between the light source and the hand,
    an imaging capture unit for creating an image of transmitted light from the hand,
    an imaging unit opening placed between the hand and the imaging capture unit, and
    a processing unit for extracting a vein pattern of the hand from the image and to compare with a registered pattern,
    wherein said light source opening and said imaging unit opening are transparent at least to the light transmitted from the light source, and
    at least the light source, the light source opening, the imaging capture unit and the imaging unit opening are placed within an enclosure,
    wherein said light source opening and said imaging unit opening are an optical filter that reduced light in the visible region, and
    wherein a structure is located between the light source opening and the image unit opening for limiting transmission of the light from the light source opening so that an imaging plane of the finger is not irradiated by the light from the light source opening.

2. The personal authentication apparatus according to claim 1, wherein said light source opening and imaging unit opening are made of glass or acrylic.

3. The personal authentication apparatus according to claim 1, wherein said optical filter passes only light in the infrared region.

4. The personal authentication apparatus according to claim 1, wherein said light source opening and said imaging unit opening are integrally formed in a chassis that is made of an optical filter material.

5. The personal identification apparatus according to claim 1, wherein the light source opening and the imaging unit opening are formed on a lateral surface of the enclosure.

6. The personal identification apparatus according to claim 1, wherein the hand subject to identification is to be disposed outside the enclosure.

7. The personal identification apparatus according to claim 1, further comprising a light shielding member for limiting a part of light from the light source.

8. The personal identification apparatus according to claim 7, wherein the light shielding member is placed inside the enclosure.

9. A personal identification apparatus comprising:
    a light source for irradiating light to a hand;
    an imaging capture unit for creating an image of transmitted light from the hand;
    an enclosure for enclosing the light source and the imaging capture unit; and
    an opening which is located between a light source opening and the hand wherein a structure is located between the opening and the image capture unit for limiting transmission of the light transmitted through the opening so that an imaging plane of the finger is not irradiated by the light transmitted through the opening.

10. The personal identification apparatus according to claim 9, wherein the opening is formed on a lateral surface of the enclosure.

11. The personal identification apparatus according to claim 9, wherein the hand subject to identification is to be disposed outside the enclosure.

12. The personal identification apparatus according to claim 9, further comprising a light shielding member for limiting a part of light from the light source.

13. The personal identification apparatus according to claim 9, wherein the light shielding member is placed inside the enclosure.

* * * * *